L. E. PARIS & A. PREMO.
MECHANICAL MOVEMENT.
APPLICATION FILED MAR. 27, 1911.
1,083,261.
Patented Dec. 30, 1913.
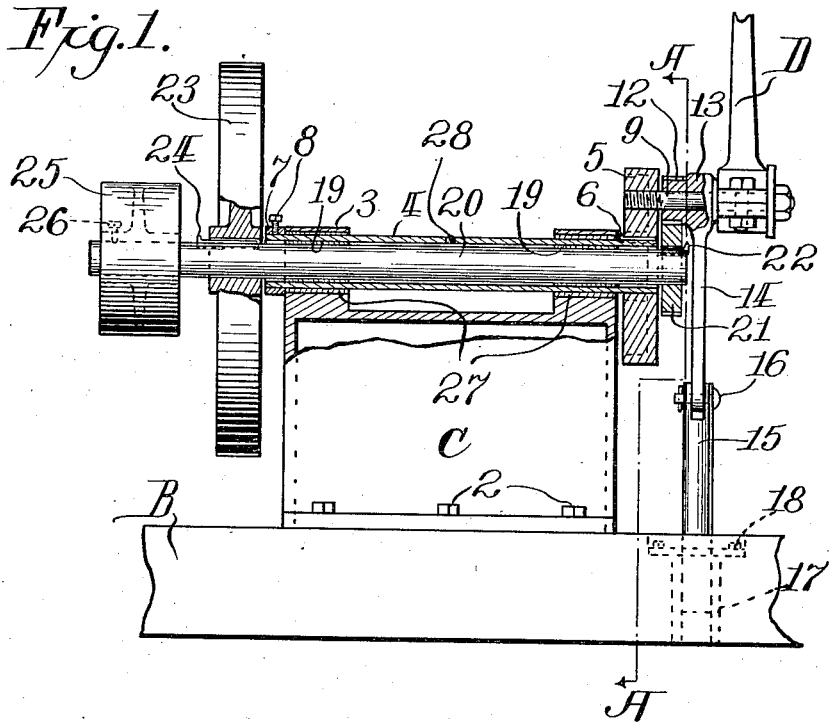
Witnesses:
Marie C. Adams
H. L. Fischer
Inventors: Louis E. Paris,
Alexander Premo,
by F. L. Bradbury
Attorney.

UNITED STATES PATENT OFFICE.

LOUIS E. PARIS AND ALEXANDER PREMO, OF ST. PAUL, MINNESOTA.

MECHANICAL MOVEMENT.

1,083,261. Specification of Letters Patent. Patented Dec. 30, 1913.

Application filed March 27, 1911. Serial No. 617,133.

*To all whom it may concern:*

Be it known that we, LOUIS E. PARIS and ALEXANDER PREMO, citizens of the United States, residing at St. Paul, in the county of Ramsey and State of Minnesota, have invented a new and useful Improvement in Mechanical Movements, of which the following is a specification.

Our invention relates to improvements in mechanical movements, and its object is to provide a gearing to be used in connection with gasolene engines and similar prime movers to increase the speed of the driven member. We have accomplished these results in a device which transforms the crank motion of the prime mover directly into rotary movement.

In the drawings with which we have illustrated our invention and which form part of the specification Figure 1 is a side elevation of our device shown partly in section, and Fig. 2 is a section on the line A—A Fig. 1.

In the above drawings we have illustrated a foundation B on which is anchored a supporting frame C fixed thereto by suitable anchor bolts 2. The frame C carries bearing boxes 3 in which is journaled a hollow tubular shaft 4 having a crank disk 5 fixed at one end outside of the bearing 3 by means of a key 6. The shaft 4 carries at one end, outside the bearing 3 a collar 7 fixed to the shaft by a set screw 8. The collar 7 and crank disk 5 take any thrust in the shaft 4. The crank disk 5 is provided with a wrist pin 9 secured thereto by a threaded connection and is formed with a counterweight portion 11 opposite to the wrist pin to balance the disk in rotation. Rotating on the wrist pin 9 is a pinion 12 formed integral with the head 13 of the guide crank 14 which is pivoted to a slide bar 15 by means of a pin 16. The slide bar 15 is fitted to reciprocate in a slideway 17 which is shown in Fig. 1 connected to the foundation B by anchor bolts 18. Within the tubular shaft are sleeves 19 forming bearings for the driven shaft 20 which extends through the entire length of the tubular shaft and is free to rotate in the bearings 19. Upon the end of the shaft 20 adjacent to the crank disk 5 is mounted the gear wheel 21 meshing with the pinion 12 and fixed to the shaft 20 by a key 22. At the opposite end of the shaft 20 adjacent to the collar 7 on the tubular shaft 4 is mounted a fly wheel 23 fixed thereto by a key 24. The fly wheel 23 and gear 21 fixed to the shaft 20 serve to prevent longitudinal movement of the shaft in its bearing. Outside of the fly wheel 23 a pulley 25 is fixed on the shaft 20 by a set screw 26. Babbitting 27 is shown in the boxes 3 and the device is lubricated through an oil plug 28 in the shaft 4.

In Fig. 1 we have illustrated a connecting rod D such as is common on gas engines in connection with the wrist pin 9. It is evident that the operation of the connecting rod D in a manner usual in gas engines will result in the rotation of the crank disk 5. As the crank disk rotates carrying with it the pinion 12, the position of the pinion upon the wrist pin 9 is determined by the guide crank 14 to which the pinion is connected and the rotation of the pinion on the wrist pin is prevented. This movement of the pinion concentric with the shaft 20 will maintain the pinion 12 in mesh with the gear wheel 21 and as the pinion does not rotate upon its axis the gear 21 is rotated by the movement of the pinion, carrying with it the shaft 20, fly wheel 23 and pulley 25.

The orbital movement of the pinion 12 with relation to the gear 21 carrying the gear with it through the meshing of the teeth on the two parts, produces a corresponding rotation of the gear, and an additional rotation due to the angular movement of the periphery of the pinion with respect to the axis of the gear. This movement depends upon the relative diameters of the pinion and gear since the periphery of the gear is advanced during a single orbital cycle of the pitman a distance equal to the perimeter of the pinion. It is evident that when the pinion and gear are of equal diameters the rotative movement of the gear due to the angular movement of the pinion during a single rotation of the crank disk, will be measured by the perimeter of either gear member, becoming a complete revolution which in addition to the rotation due to the orbital movement of the pinion increases the speed of the gear and shaft 20 over that of the crank disk 9 or shaft 4. Further increase in the diameter of the pinion with relation to the gear will increase the amount of rotation of the gear in the same manner. It is thus evident that the movement of the pinion in its orbit about the gear increases the speed of the gear.

The crank action of the guide 14 causes an acceleration in the angular speed of the pinion with respect to the axis of the shaft 20 in different parts of the orbital movement of the pinion. This change in speed may become negligible by lengthening the crank 14. It is evident that the pinion 12 may be directly connected to the connecting rod D of an engine if desired, eliminating the guide 14 and slide rod 15.

It will be noted that the device has been described with relation to the conversion of reciprocating to rotative movement in which it is possible to increase the speed by any amount by changing the proportions of the pinion and gear. The crank disk 5 becomes the driven element from which power may be taken.

In accordance with the patent statutes we have described the principles of operation of our invention together with the apparatus which we now consider to represent the best embodiment thereof but we desire to have it understood that the construction shown is only illustrative and that the invention can be carried out by other means and applied to uses other than those above set forth within the scope of the following claims.

Having described our invention, what we claim as new and desire to protect by Letters Patent is:—

1. In a power transmission device, a suitable frame, a tubular shaft journaled in said frame, a crank disk and collar carried on said shaft outside of the journal to prevent longitudinal movement of said shaft, a crank pin on said disk, a guide pitman having a rigid pinion journaled upon said pin, a slide bar fitted to reciprocate in said frame and pivotally attached to said pitman, journal sleeves in said tubular shaft, a driven shaft journaled in said sleeves and extending lengthwise through said tubular shaft, a gear wheel rigidly mounted on said driven shaft and having teeth engaging with the teeth of said pinion to transmit power, a fly wheel on said driven shaft, said gear wheel and fly wheel being positioned outside of the ends of said tubular shaft to limit longitudinal movement of said driven shaft, transmission means mounted upon said driven shaft and a connecting rod journaled upon said crank pin for the purposes specified.

2. In a power transmission device, a supporting frame, a hollow shaft journaled upon said frame, a crank element carried by said shaft, a crank pin on said crank element, a guide pitman having a pinion journaled upon said pin, a guide fitted to reciprocate on said frame and pivotally attached to said pitman, a driven shaft journaled in said hollow shaft, a gear wheel rigidly attached to said driven shaft and having teeth engaging with the teeth of said pinion to transmit power, and a fly wheel on said driven shaft, said gear wheel and fly wheel being placed at the opposite ends of said hollow shaft and adapted to limit longitudinal movement of said driven shaft, transmission means mounted upon said driven shaft and a driving element journaled upon said crank pin for rotating the free end of said crank element.

In testimony whereof, we have signed our names to this specification, in the presence of two subscribing witnesses.

LOUIS E. PARIS.
ALEXANDER PREMO.

Witnesses:
H. L. FISCHER,
F. G. BRADBURY.

Copies of this patent may be obtained for five cents each, by addressing the "Commissioner of Patents, Washington, D. C."